US009678997B2

(12) United States Patent
Burckart et al.

(10) Patent No.: US 9,678,997 B2
(45) Date of Patent: Jun. 13, 2017

(54) VERSION CONTROL WITH ACCEPT ONLY DESIGNATIONS

(71) Applicant: International Business Machines Corporation, Armonk, NY (US)

(72) Inventors: Erik J. Burckart, Raleigh, NC (US); Andrew J. Ivory, Wake Forest, NC (US); Aaron Kyle Shook, Raleigh, NC (US); David M. Stecher, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 704 days.

(21) Appl. No.: 14/064,165

(22) Filed: Oct. 27, 2013

(65) Prior Publication Data

US 2015/0120685 A1 Apr. 30, 2015

(51) Int. Cl.
*G06F 17/30* (2006.01)
(52) U.S. Cl.
CPC .............. *G06F 17/30309* (2013.01)
(58) Field of Classification Search
CPC ......... G06F 17/30286; G06F 17/30008; G06F 17/30309
USPC ....................................................... 707/695
See application file for complete search history.

(56) References Cited

U.S. PATENT DOCUMENTS

| 8,151,200 B2* | 4/2012 | Roger | H04L 12/1822 |
| | | | 709/204 |
| 2003/0117437 A1* | 6/2003 | Cook | G06F 17/30581 |
| | | | 715/764 |
| 2009/0019426 A1 | 1/2009 | Baeumer et al. | |
| 2010/0114827 A1* | 5/2010 | Pearce | G06Q 10/10 |
| | | | 707/638 |
| 2011/0023007 A1* | 1/2011 | Chumbley | G06F 8/71 |
| | | | 717/102 |
| 2014/0033067 A1* | 1/2014 | Pittenger | G06F 21/606 |
| | | | 715/751 |

OTHER PUBLICATIONS

"Concurrent Versions System," [online] Wikipedia, the free encyclopedia, modified Oct. 21, 2013 [retrieved Oct. 25, 2013] retrieved from the Internet: < http://en.wikipedia.org/w/index.php?title=Concurrent_Versions_System&oldid=578177888>, 8 pg.

* cited by examiner

*Primary Examiner* — Scott A Waldron
*Assistant Examiner* — Dongming Wang
(74) *Attorney, Agent, or Firm* — Cuenot, Forsythe & Kim, LLC

(57) ABSTRACT

Version control for a document can include receiving from a user a request to commit one or more revisions to a master document in a document repository. The one or more revisions can be included in a local copy of the master document. A processor can determine whether an accept only designation is assigned to at least a portion of the local copy. In response to a determination that an accept only designation is assigned to at least a portion of the local copy, the respective revisions assigned an accept only designation can be disallowed from incorporation into the master document. Revisions made to the master document can be sent to the user for incorporation into the user's local copy of the master document. Such sending is not prevented by the assignment of an accept only designation to at least a portion of the local copy of the master document.

20 Claims, 4 Drawing Sheets

200

Receiving from a user a request to commit one or more revisions to a master document in a document repository, the one or more revisions being included in a local copy of the master document

205

Determining whether an accept only designation is assigned to at least a portion of the local copy of the master document

210

Responsive to determining that an accept only designation is assigned to at least a portion of the local copy of the master document, disallowing the respective revisions included in the at least a portion of the local copy of the master document assigned an accept only designation from being incorporated into the master document

215

Sending revisions made to the master document to the user for incorporation into the user's local copy of the master document, wherein the sending revisions is not prohibited by the user's assignment of an accept only designation to at least a portion of the local copy of the master document

Presenting a user interface element on a client to allow a user to selectively assign an accept only designation to at least a portion of a local copy of a master document

305

---

Receiving an input from a user assigning an accept only designation to at least a portion of the local copy of the master document

310

---

Receiving an input from the user making one or more revisions to the local copy of the master document

315

---

Responsive to an input from the user, sending a request to commit the one or more revisions to the master document to a version control module, whereby any of the one or more revisions included in the at least a portion of the local copy of the master document assigned an accept only designation are disallowed from being incorporated into the master document

320

---

Receiving revisions made to the master document for inclusion in the local copy of the master document, wherein the receiving revisions is not prohibited if the user has assigned an accept only designation to at least a portion of the local copy of the master document

VERSION CONTROL WITH ACCEPT ONLY DESIGNATIONS

BACKGROUND

Arrangements described herein relate to version control systems and methods.

Generally, version control relates to the management of multiple versions of a document, such as a computer file having a computer program source code. In the field of software development, authorized developers can access a file from a repository hosted or managed by a server computer and make revisions to the file. Version control systems are used to manage the developer's access to the files. Version control systems can allow developers to back up their changes and sync such changes across multiple developers on a project.

In some instances, a developer may not wish to have its changes to a certain file delivered to the repository, but the developer may still need to accept changes to the file made by other developers. There are various ways in which a developer can do so. For example, current version control systems allow software developers to designate a file as "ignore." In such case, the file is treated as being outside of the version control system. Changes to the file made by the developer are not delivered to the repository, and changes to the file made by other developers cannot be accepted. As another example, a file can be designated as "read only", that is, the file can only be modified by certain individuals with write permission. In still a further example, a developer may not apply any designation to a file, but it must be careful to ensure that changes to a file are not inadvertently delivered to the repository.

SUMMARY

One or more embodiments disclosed within this specification relate to version control and, more particularly, to version control in which an accept only designation can assigned to at least a portion of a document.

An embodiment can include a method of providing version control for a document. The method can include receiving from a user a request to commit one or more revisions to a master document in a document repository. The one or more revisions can be included in a local copy of the master document. The method can include determining, via a processor, whether an accept only designation is assigned to at least a portion of the local copy of the master document. The method can further include, responsive to determining that an accept only designation is assigned to at least a portion of the local copy of the master document, disallowing the respective revisions included in the at least a portion of the local copy of the master document assigned an accept only designation from being incorporated into the master document. The method can also include sending revisions made to the master document to the user for incorporation into the user's local copy of the master document. The sending revisions is not prohibited by the user's assignment of an accept only designation to at least a portion of the local copy of the master document. The sent revisions do not include revisions disallowed in response to determining that an accept only designation is assigned to at least a portion of the local copy of the master document.

Another embodiment can include a version control method for a document. The method can include presenting a user interface to allow a user to selectively assign an accept only designation to at least a portion of the local copy of the master document on a client. The method can further include receiving an input from a user assigning an accept only designation to at least a portion of the local copy of the master document. The method can include receiving an input from the user making one or more revisions to the local copy of the master document. The method can also include, responsive to an input from the user, sending a request to commit the one or more revisions to the master document to a version control module. Any of the one or more revisions included in the at least a portion of the local copy of the master document assigned an accept only designation are disallowed from being incorporated into the master document. The method can also include receiving revisions made to the master document for inclusion in the local copy of the master document. The receiving revisions is not prohibited if the user has assigned an accept only designation to at least a portion of the local copy of the master document.

Another embodiment can include a version control system. The system can have a processor. The processor can be configured to initiate executable operations. The executable operations can include receiving from a user a request to commit one or more revisions to a master document in a document repository. The one or more revisions can be included in a local copy of the master document. Further, the executable operations can include determining whether an accept only designation is assigned to at least a portion of the local copy of the master document. The executable operations can also include, responsive to determining that an accept only designation is assigned to at least a portion of the local copy of the master document, disallowing the respective revisions included in the at least a portion of the local copy of the master document assigned an accept only designation from being incorporated into the master document. The executable operations can include sending revisions made to the master document to the user for incorporation into the user's local copy of the master document. The sending revisions is not prohibited if the user has assigned an accept only designation to at least a portion of the local copy of the master document. The revisions do not include any revisions that were disallowed in response to determining that an accept only designation was assigned to at least a portion of the local copy of the master document.

BRIEF DESCRIPTION OF THE SEVERAL VIEWS OF THE DRAWINGS

FIG. 2 is a flow chart illustrating a version control method in which a document can be designated as accept only in accordance with one embodiment disclosed within this specification.

FIG. 3 is a flow chart illustrating a version control method in which a document can be designated as accept only in accordance with one embodiment disclosed within this specification.

DETAILED DESCRIPTION

Figure 1:
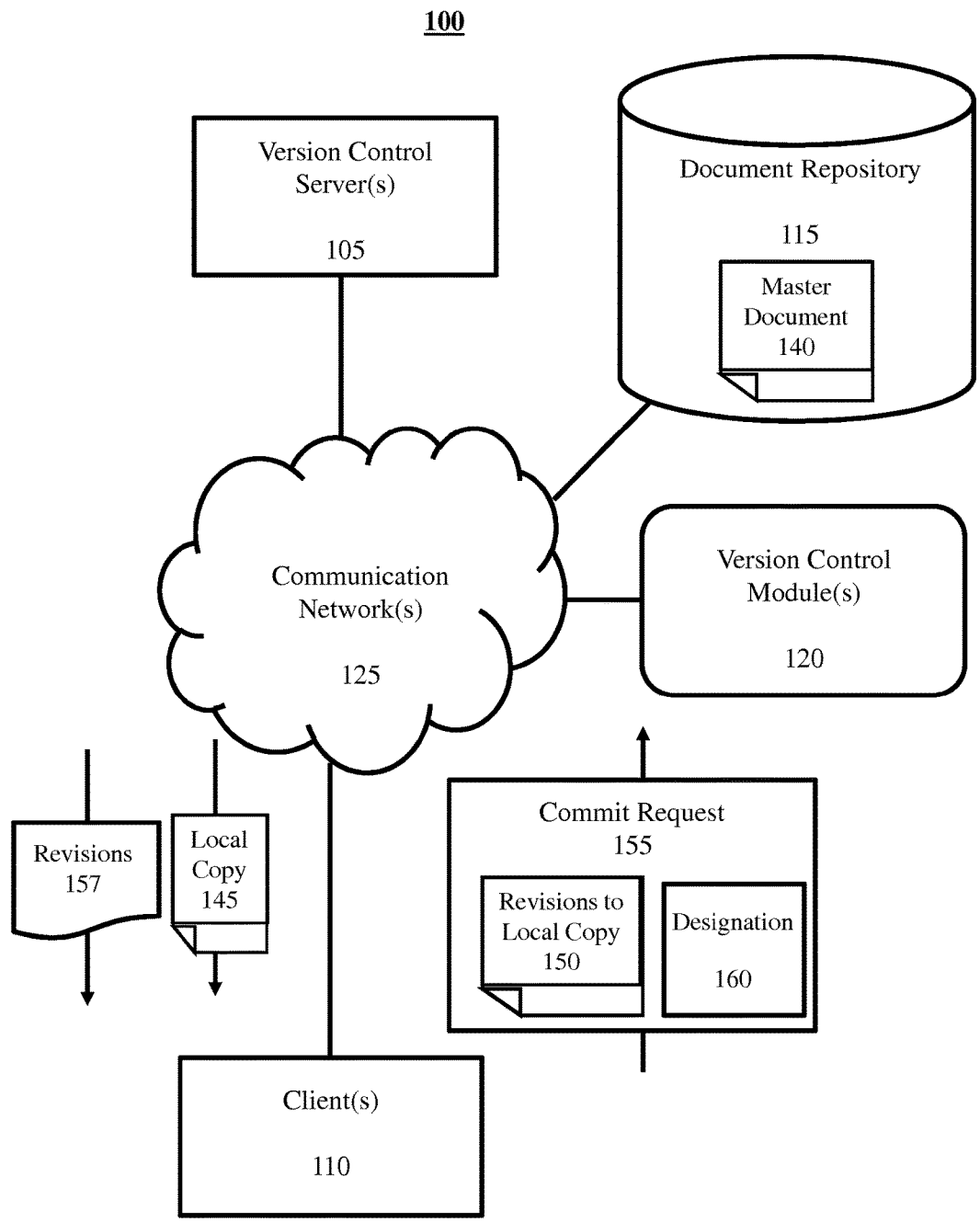
FIG. 1 is a block diagram illustrating a version control system configured to allow documents to be designated as accept only in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating a version control system 100 configured to allow documents to be designated as accept only in accordance with one embodiment of the present invention. The version control system 100 can include one or more servers 105, one or more clients 110, and a document repository 115. The version control system 100 can further include a version control module 120. The various components of system 100 can be communicatively linked through one or more communication networks 125. As used herein, the term "communicatively linked" can include direct or indirect connections through a communication channel or pathway or another component or system. A "communication network" means one or more components designed to transmit and/or receive information from one source to another, including in a centrally-coordinated manner or in a peer-to-peer fashion.

The one or more communication networks 125 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 125 further can be implemented as or include one or more wireless networks, whether short or long range. For example, in terms of short range wireless networks, the communication network 125 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 125 can include a mobile, cellular, and or satellite-based wireless network and support voice, video, text, and/or any combination thereof. Examples of long range wireless networks can include GSM, TDMA, CDMA, WCDMA networks or the like. The communication network 125 can include wired communication links and/or wireless communication links. The communication network 125 can include any combination of the above networks and/or other types of networks. The communication network 125 can include one or more routers, switches, access points, wireless access points, and/or the like.

The one or more servers 105 can be implemented as a version control server or other communication hub or server capable of storing and/or processing documents within or as part of the communication network 125. The server 105 can include suitable operational software for performing the various functions described herein.

The client(s) 110 can be implemented as any of a variety of communication devices capable of transmitting and receiving communication signals and/or executing suitable communication software. For example, each client 110 can be implemented as a computer system or other information processing system. One or more of the clients 110 may be a desktop computer. One or more of the clients 110 may also be implemented as a portable or mobile computing device, e.g., a mobile telephone, a smart phone, a wireless-enabled personal digital assistant, a portable computer, e.g., laptop, tablet or the like. Each of the clients 110 can include and/or execute suitable communication software (e.g., a version control client) which enables the client 110 to communicate with the server 105, other clients 110, the document repository 115 and/or the version control module 120 through the communication network 125 and perform the functions disclosed herein.

Again, the system 100 can include a document repository 115. The document repository 115 can be any medium for storing one or more documents for accessing, check-out and/or check-in by one or more users. The term "document" means any electronic document, file, computer program code (e.g. computer program source code), collection of related data records (as for a computer), or set of instructions for use with a computing device. The term "document" can also include a partial or complete collection of data (as text or a program) treated by a computer as a unit especially for purposes of input and output. It should be appreciated that while a single document repository 115 is illustrated in FIG. 1, a plurality of document repositories, each storing one or more documents can be included.

The version control system 100 can include a version control module 120. In one embodiment, the version control module 120 can be stored on, accessed by and/or executed on the one or more clients 110. Alternatively or in addition, the version control module 120 can be stored on, accessed by and/or executed on the server 105.

The version control module 120 can be implemented as computer readable program code that, when executed by a processor, implement the various processes described herein. The version control module 120 can process documents within the version control system 100, e.g., documents, whether within a single document repository or located across a plurality of different document repositories.

The version control module 120 can be configured to allow a user to apply one or more designations to at least a portion of a document. A "user" can be a person or other entity. The version control module 120 can be configured to process the one or more user-applied designations to at least a portion of a document.

The document repository 115 can include one or more master documents 140. One or more users can check-out a master document 140 from the document repository 115. That is, one or more users can access, copy, create or download a local copy 145 of the master document 140 on or to a respective client 110. A plurality of users may check-out a respective local copy 145 of the same master document 140 from the document repository 115.

A user can make revisions 150 to the local copy 145 of the master document 140. The user can check-in the local copy 145 of the master document 140 and request that the revisions 150 made thereto be incorporated into the master document 140. For instance, the user can do so by sending a commit request 155. A "commit request" or "request to commit" is the sending, submitting, delivering, or transferring of revisions to a master document with a request that the revisions be incorporated into a master document.

The version control module 120 can receive the commit request 155. The version control module 120 can process the commit request 155. If the commit request 155 with revisions 150 is accepted, the revisions 150 can be incorporated into the respective master document 140 so that a new version of the master document 140 is created and stored in the document repository 115. In some instances, the system 100 can be configured so that only authorized users are permitted to check-in and/or check-out documents from the document repository 115.

If revisions are made to the master document 140, the version control module 120 can be configured to send such revisions 157 to all local copies 145 of the master document 140. The changes 150 can be pushed to the local copies 145, that is, the revisions 157 are automatically incorporated into the local copies 145. Alternatively or in addition, a user having a local copy 145 can be prompted to accept the revisions 157. In this way, the user can selectively incorporate the revisions 157 to the user's local copy 145 of the master document 140. The sending of the revisions 157 to the master document 140 to local copies 145 of the master document 140 can occur at any suitable time. For instance, the sending can occur at a predetermined point in time, after a certain quantity or percentage of changes are incorporated in the master document 140, after any revision is made to the master document 140, upon the request of a user and/or combinations thereof, just to name a few possibilities.

The system 100 can be configured to allow a user to selectively assign one or more designations 160 to at least a portion of a document (e.g. local copy 145). A "designation" is any instruction that can be processed by a version control system so that the version control system treats the revisions made to a local copy of a master document in a specified manner. The designation 160 can be preconfigured by the version control system or by a system default. Alternatively or in addition, the designation 160 can be configured by a user or some other entity. "Assign to at least a portion of a document" means that a designation may be selectively assigned to the document (e.g. a local copy 145) as a whole, or the designation may be selectively assigned to one or more portions of a document (e.g. a local copy 145).

The designation 160 can be assigned to the local copy 145 of the master document 140 in any suitable manner. For instance, the system 100 can receive designations 160 by inputs received from a user. Accordingly, the system 100 can present an input system for receiving user inputs. Any suitable input system can be used, including, for example, a keyboard, keypad, display, touch screen, button, joystick, mouse, trackball, microphone or combinations thereof. In one implementation, a user interface can be provided to allow a user to selectively assign a designation 160 to at least a portion of a document. A "user interface" is defined as a component, system or arrangement or groups thereof that enable a user to enter information/data into a machine.

The user interface can include one or more user interface elements, which can include one or more graphical user interface elements. A "user interface element" is defined as a component or a group of components that enables a user to interact with a machine. The term "graphical user interface element" is defined as an image or a portion of an image that presents information to a user or allows the user to interact with a device through a display. As an example, one or more graphical user interface elements (e.g. buttons, checkboxes, drop down menus, etc.) can be presented to facilitate a user's input of a desired designation. When received from a user, an input designation can be assigned to at least a portion of the document as indicated by the user. In some implementations, the designation may be applied to the document as a whole. Alternatively or in addition, the designation may be applied to one or more portions of a document. The user may be presented with one or more predetermined designations from which to select.

It should be noted that a user may selectively remove or change a designation 160 assigned to at least a portion of a document (e.g. the local copy 145 of the master document 140). To that end, the user may enter an input to remove or change a designation 160. Such input can be received in any of the manners described above, such as by selecting a user interface element presented to the user.

Further, the version control module 120 can be configured to determine whether a designation 160 is assigned to a commit request 155 and/or a local copy 145 of a master document 140 associated with a commit request 155. If it is determined that a designation 160 is assigned, then the designation 160 can be analyzed and/or processed by the version control module 120. The version control module 120 can process the commit request 155 and/or a local copy 145 of a master document 140 associated with a commit request 155 in accordance with the designation 160.

Arrangements herein can include an "accept only" designation 165. When an accept only designation 165 is assigned to at least a portion of a document, the user's revisions 150 to the at least the portion of the document are disallowed from being incorporated into the master document 140 in the document repository 115 and are not included in any outgoing revisions 157 sent by or caused to be sent by the version control module 120. However, outgoing revisions 157 are still sent by or caused to be sent by the version control module 120 to the users of local copies 145 of a master document 140, including those users who have designated at least a portion of their local copy 145 of the master document 140 as accept only. Such outgoing revisions 157 can be selectively or automatically incorporated into each local copy 145 of the master document 140.

As an example, a first user and a second user can each check-out a local copy 145 of a document 140 from the document repository 115. For purposes of this example, the first user designates the local copy 145 of the master document 140 as accept only, and the second user does not assign a designation 160 to the local copy 145 of the master document 140.

The first user can make revisions 150 to its local copy 145 of the master document 140. The first user may request that the revisions 150 be committed to the master document 140 in the document repository 115. The version control module 120 can determine whether an accept only designation is assigned to the local copy 145. In this example, because the accept only designation is assigned to the first user's local copy 145 as a whole, the version control module 120 will disallow all revisions 150 from being incorporated into the master document 140. Further, the disallowed revisions will not be included in any revisions 157 may be sent by or caused to be sent by the version control module 120 to any users who have checked-out a local copy 145 of the master document 140 (e.g. the first and second users).

The second user can make revisions 150 to its local copy 145 of the master document 140. If the second user submits a commit request with those revisions 150, the revisions 150 will be committed to the master document 140 because the second user has not designated its local copy 145 as accept only, nor has the second user assigned another designation to the local copy 145 that would cause the version control module 120 to disallow the revisions 150. The master document 140 can be revised, and the revisions can be included in any outgoing revisions 157 sent by or caused to be sent by the version control module 120 to any users who have checked-out a local copy 145 of the master document 140. Thus, the first and second users will receive the revisions 157. Since the first user has assigned an accept only designation to its local copy 145 of the master document 140, the first user will continue to receive revisions made to the master document 140 from other users (e.g. the second user).

The revisions 157 can be sent to the first user in any suitable manner. For instance, the first user may decide to update its local copy 145 of the master document 140. In such case, the first user can request an update from the version control module 120. The version control module 120 can sent the revisions 157 to the first user. In some implementations, the first user can selectively accept one or more of the revisions 157 for incorporation into its local copy 145 of the master document 140. If accepted, the revisions 140 are made to the first user's local copy 145 of the master document 140. In some instances, the revisions 157 can be automatically incorporated into to the first user's local copy 145 of the master document 140 without allowing the user to decide whether to accept the revisions 157.

The first user may later decide that it wishes to submit a request to commit its revisions to the local copy 145 of the master document 140. The first user may selectively remove the accept only designation from at least a portion of the local copy 145 of the master document 140. The removal of the accept only designation can occur at any time, such as before and/or after revisions 150 are made to the local copy 145 of the master document 140. The first user can submit its revisions 150 to the local copy 145 of the master document 140 to the version control module 120. Since the accept only designation is removed, the version control module 120 will allow the revisions 150 to be incorporated into the master document 140 in the document repository 115.

In some instances, the version control module 120 can be configured to send or have sent a notification to a user regarding the status of its commit request. For instance, the version control module 120 can be configured to send or have sent a notification that one or more of the revisions 150 associated with the commit request 155 was disallowed due to an accept only designation being assigned to at least a portion of the local copy 145 of the master document 150. The notification can be provided in any suitable form, such as, for example, an electronic mail message, an instant message (IM), a Short Messaging System (SMS), or other message. The notification can be created within one of the servers 105, clients 110, version control module 120 or other system.

Further, the version control module 120 can be configured to monitor the designations 160 assigned to local copies 145 of a master document 140. Such monitoring can be performed on any suitable basis, such as continuous, periodic, irregular or even randomly. In some instances, the version control module 120 can be configured to prevent a user from sending a commit request if at least a portion of the associated local copy 145 of the master document 140 is designated as accept only.

It should be appreciated that the processing of designations 160 as described herein can be performed by the server 105, the client 110, or any combination thereof depending upon the particular implementation. In another implementation, the version control module 115 can perform the processing of designations and may be invoked by either the clients 110 and/or the server 105.

FIG. 2 is a flow chart illustrating a method 200 of providing version control for a document in accordance with one embodiment disclosed within this specification. At step 205, a request to commit one or more revisions to a master document in a document repository can be received from a user. The one or more revisions can be included in a local copy of the master document. At step 210, it can be determined, via a processor, whether an accept only designation is assigned to at least a portion of the local copy of the master document.

At step 215, responsive to determining that an accept only designation is assigned to at least a portion of the local copy of the master document, the respective revisions included in the at least a portion of the local copy of the master document assigned an accept only designation can be disallowed from being incorporated into the master document. At step 220, revisions made to the master document can be sent to the user for incorporation into the user's local copy of the master document. The sending revisions is not prohibited by the user's assignment of an accept only designation to at least a portion of the local copy of the master document. The sent revisions do not include revisions disallowed in response to determining that an accept only designation is assigned to at least a portion of the local copy of the master document.

FIG. 3 is a flow chart illustrating a method 200 of providing version control for a document in accordance with one embodiment disclosed within this specification. At step 305, a user interface can be presented on a client to allow a user to selectively assign an accept only designation to at least a portion of the local copy of the master document. At step 310, an input can be received from a user assigning an accept only designation to at least a portion of the local copy of the master document. At step 315, an input can be received from the user making one or more revisions to the local copy of the master document.

At step 320, responsive to an input from the user, a request to commit the one or more revisions to the master document can be sent to a version control module. Any of the one or more revisions included in the at least a portion of the local copy of the master document assigned an accept only designation can be disallowed from being incorporated into the master document. At step 325, revisions made to the master document can be received for inclusion in the local copy of the master document. The receiving revisions is not prohibited if the user has assigned an accept only designation to at least a portion of the local copy of the master document.

Figure 4:
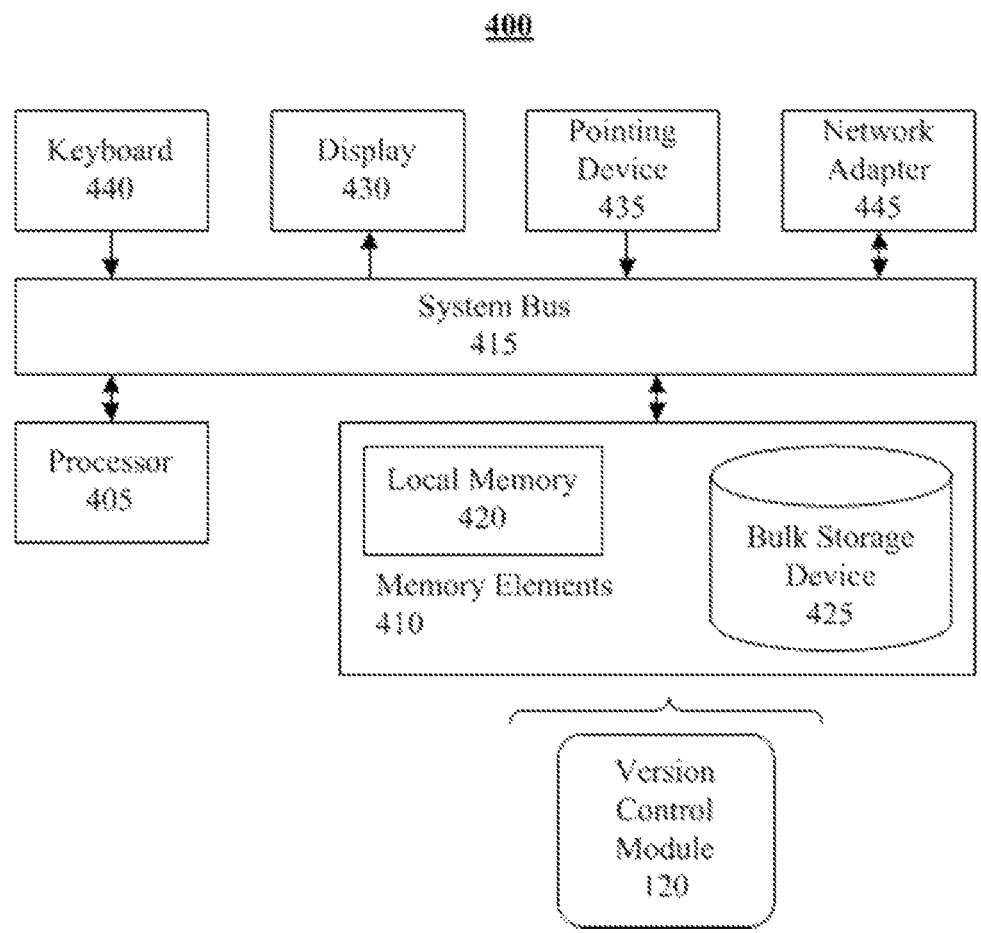
FIG. 4 is a block diagram illustrating a system configured to allow documents to be designated as accept only in accordance with one embodiment disclosed within this specification.

FIG. 4 is a block diagram illustrating an example of a data processing system 400. System 400 can include at least one processor (e.g., a central processing unit) 405 coupled to memory elements 410 through a system bus 415 or other suitable circuitry. As such, system 400 can store program code within memory elements 410. Processor 405 executes the program code accessed from memory elements 410 via system bus 415 or the other suitable circuitry.

In one aspect, system 400 is implemented as a computer or other programmable data processing apparatus that is suitable for storing and/or executing program code. It should be appreciated, however, that system 400 can be implemented in the form of any system including a processor and memory that is capable of performing and/or initiating the functions and/or operations described within this specification. Further, system 400 can be implemented in any of a variety of different form factors including, but not limited to, a portable device such as a mobile communication device, a tablet computing and/or communication device, a laptop computing device, a desktop computing device, a server, or the like.

Memory elements 410 include one or more physical memory devices such as, for example, local memory 420 and one or more bulk storage devices 425. Local memory 420 refers to RAM or other non-persistent memory device(s) generally used during actual execution of the program code. Bulk storage device(s) 425 can be implemented as a hard disk drive (HDD), solid state drive (SSD), or other persistent data storage device. System 400 also can include one or more cache memories (not shown) that provide temporary storage of at least some program code in order to reduce the number of times program code must be retrieved from bulk storage device 425 during execution.

Input/output (I/O) devices such as a keyboard 430, a display 435, and a pointing device 440 optionally can be coupled to system 400. The I/O devices can be coupled to system 400 either directly or through intervening I/O controllers. One or more network adapters 445 also can be coupled to system 400 to enable system 400 to become coupled to other systems, computer systems, remote printers, and/or remote storage devices through intervening private or public networks. Modems, cable modems, wireless transceivers, and Ethernet cards are examples of different types of network adapters 445 that can be used with system 400.

As pictured in FIG. 4, memory elements 410 can store a version control module 120. Version control module 120, being implemented in the form of executable program code, is executed by system 400 and, as such, is considered an integrated part of system 400. Version control module 120 can determine whether an accept only designation is assigned to at least a portion of the local copy of the master document. Moreover, the version control module 120, including any parameters and/or attributes utilized by module 120, are functional data structures that impart functionality when employed as part of system 400.

Allowed revisions to the master document can be output to, and stored within, memory elements 410. As used herein, "outputting" and/or "output" can mean storing in memory elements 410, for example, writing to a file stored in memory elements 410, writing to display 435 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of providing version control for a document comprising:

receiving from a user a request to commit one or more revisions to a master document in a document repository, the one or more revisions being included in a local copy of the master document;

determining, via a processor, whether an accept only designation is assigned to at least a portion of the local copy of the master document by the user;

responsive to determining that an accept only designation is assigned to at least a portion of the local copy of the master document, disallowing the respective revisions included in the at least a portion of the local copy of the master document assigned an accept only designation from being incorporated into the master document; and sending revisions made to the master document to the user for incorporation into the user's local copy of the master document, wherein the sending revisions is not prohibited by the user's assignment of an accept only designation to at least a portion of the local copy of the master document, whereby the sent revisions do not include revisions disallowed in response to determining that an accept only designation is assigned to at least a portion of the local copy of the master document.

2. The method of claim 1, further including automatically revising the user's local copy of the master document with the sent revisions.

3. The method of claim 1, further including prompting the user as to selectively accept the sent revisions for incorporation into the user's local copy of the master document.

4. The method of claim 1, wherein sending revisions made to the master document to the user for incorporation into the user's local copy of the master document occurs in response to a user request to update the local copy of the master document.

5. The method of claim 1, further including:

responsive to determining that no designation is assigned to at least a portion of the local copy of the master document or to determining that a designation is assigned to at least a portion of the local copy of the master document that does not prohibit incorporation of the one or more revisions to the master document, allowing the respective revisions to be incorporated into the master document.

6. The method of claim 1, further including:

receiving from the user a request to commit one or more revisions to a master document in a document repository, wherein the user previously assigned an accept only designation to at least a portion of the local copy of the master document but has subsequently removed the accept only designation; and responsive to determining that no designation is assigned to at least a portion of the local copy of the master document or to determining that any designation assigned to at least a portion of the local copy of the master document does not prohibit incorporation of the one or more revisions to the master document, allowing the respective revisions to be incorporated into the master document.

7. The method of claim 1, wherein sending revisions made to the master document to the user for incorporation into the user's local copy of the master document includes sending revisions made to the master document by one or more other users.

8. A version control method comprising:
presenting a user interface element on a client to allow a user to selectively assign an accept only designation to at least a portion of a local copy of a master document;
receiving, from a user, an assigning input to assign an accept only designation to at least a portion of the local copy of the master document;
receiving, from the user, a version input to make one or more revisions to the local copy of the master document;
sending, responsive to a request input from the user, sending a request to commit the one or more revisions to the master document to a version control module, whereby any of the one or more revisions included in the at least a portion of the local copy of the master document assigned an accept only designation are disallowed from being incorporated into the master document; and
receiving revisions made to the master document for inclusion in the local copy of the master document, wherein
the receiving revisions is not prohibited if the user has assigned an accept only designation to at least a portion of the local copy of the master document.

9. The method of claim 8, further including automatically revising the local copy of the master document with the received revisions.

10. The method of claim 8, further including
prompting the user for an indicating input to indicate whether the received revisions are to be incorporated into the local copy of the master document.

11. The method of claim 8, wherein receiving revisions made to the master document for inclusion in the local copy of the master document occurs in response to request from the user to update the local copy of the master document.

12. The method of claim 8, further including
receiving a removal input from a user to remove one or more previously assigned accept only designations to the local copy of the master document.

13. The method of claim 8, wherein the master document and the local copy of a master document are computer files including a computer program code.

14. A version control system comprising:
a hardware processor programmed to initiate the following executable operations:
receiving from a user a request to commit one or more revisions to a master document in a document repository, the one or more revisions being included in a local copy of the master document;
determining whether an accept only designation is assigned to at least a portion of the local copy of the master document by the user;
responsive to determining that an accept only designation is assigned to at least a portion of the local copy of the master document, disallowing the respective revisions included in the at least a portion of the local copy of the master document assigned an accept only designation from being incorporated into the master document; and
sending revisions made to the master document to the user for incorporation into the user's local copy of the master document, wherein the sending revisions is not prohibited if the user has assigned an accept only designation to at least a portion of the local copy of the master document, whereby the sent revisions do not include any revisions disallowed in response to determining that an accept only designation is assigned to at least a portion of the local copy of the master document.

15. The system of claim 14, further including automatically revising the user's local copy of the master document with the sent revisions.

16. The system of claim 14, further including prompting the user as to selectively accept the sent revisions for incorporation into the user's local copy of the master document.

17. The method of claim 14, wherein sending revisions made to the master document to the user for incorporation into the user's local copy of the master document occurs in response to a user request to update the local copy of the master document.

18. The method of claim 14, further including:
responsive to determining that no designation is assigned to at least a portion of the local copy of the master document or to determining that a designation is assigned to at least a portion of the local copy of the master document that does not prohibit incorporation of the one or more revisions to the master document, allowing the respective revisions to be incorporated into the master document.

19. The method of claim 14, further including:
receiving from the user a request to commit one or more revisions to a master document in a document repository, wherein the user previously assigned an accept only designation to at least a portion of the local copy of the master document but has subsequently removed the accept only designation; and
responsive to determining that no designation is assigned to at least a portion of the local copy of the master document or to determining that any designation assigned to at least a portion of the local copy of the master document does not prohibit incorporation of the one or more revisions to the master document, allowing the respective revisions to be incorporated into the master document.

20. The method of claim 14, wherein the master document and the local copy of a master document are computer files including a computer program code.

* * * * *